(12) United States Patent
Horton et al.

(10) Patent No.: US 7,711,853 B2
(45) Date of Patent: May 4, 2010

(54) RESOLVING NAMES TO NETWORK ENDPOINTS

(75) Inventors: Noah Horton, Redmond, WA (US);
Eliot J. Flannery, Redmond, WA (US);
Gianluigi Nusca, Redmond, WA (US);
Scott A. Senkeresty, Redmond, WA (US); Sandeep K. Singhal, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 923 days.

(21) Appl. No.: 11/486,782

(22) Filed: Jul. 14, 2006

(65) Prior Publication Data

US 2008/0016234 A1 Jan. 17, 2008

(51) Int. Cl.
*G06F 15/16* (2006.01)
(52) U.S. Cl. .................. 709/245; 709/221; 709/203
(58) Field of Classification Search .......... 709/245, 709/220–221, 226, 203, 223–224
See application file for complete search history.

(56) References Cited

U.S. PATENT DOCUMENTS

| | | | | |
|---|---|---|---|---|
| 6,061,743 | A * | 5/2000 | Thatcher et al. | 707/100 |
| 6,381,627 | B1 * | 4/2002 | Kwan et al. | 709/245 |
| 6,947,925 | B2 | 9/2005 | Newcombe et al. | |
| 7,194,553 | B2 * | 3/2007 | Lucco et al. | 709/245 |
| 7,289,519 | B1 * | 10/2007 | Liskov | 709/217 |
| 2004/0064721 | A1 | 4/2004 | Murching et al. | |
| 2004/0128544 | A1 | 7/2004 | Hondo et al. | |
| 2004/0162997 | A1 | 8/2004 | Hopmann et al. | |
| 2005/0039045 | A1 | 2/2005 | Wheeler | |
| 2005/0076141 | A1 * | 4/2005 | Williams et al. | 709/245 |
| 2007/0201483 | A1 * | 8/2007 | Gerasimov et al. | 370/395.5 |
| 2007/0220591 | A1 * | 9/2007 | Damodaran et al. | 726/4 |
| 2007/0294427 | A1 * | 12/2007 | Retkin et al. | 709/245 |

FOREIGN PATENT DOCUMENTS

| | | |
|---|---|---|
| WO | WO0175556 A2 | 10/2001 |
| WO | WO2005046184 A1 | 5/2005 |

OTHER PUBLICATIONS

"The Domain Name System," Incognito Software Inc., white paper, 2006.*
"Name Resolution Techniques", http://www.microsoft.com/technet/Security/bestprac/bpent/sec3/nameres.mspx#E3F , 2006.

(Continued)

*Primary Examiner*—Philip B Tran
(74) *Attorney, Agent, or Firm*—Hope Bakbuff Hartman, LLC

(57) ABSTRACT

A system, apparatus, method, and computer-readable medium are provided for resolving a name to a network endpoint. According to one method, naming providers are registered with a computer system that are operative to resolve names to network endpoints for one or more domains. A provider can claim to be a primary provider or a secondary provider for a domain. A provider can also register as a wildcard provider. Once the providers have been registered, requests may be received to resolve an e-mail address into a network address of the corresponding computer system. In response to such a request, one or more of the registered providers are identified as being able to resolve names in the domain to network addresses. Requests are transmitted to the identified providers requesting that they resolve the e-mail address to a corresponding network address. The manner in which the requests are made depends upon whether authoritative results are required. Once the results of the name resolution have been returned, the results are utilized to establish a network connection to and communicate with the computer system identified by the returned network address.

12 Claims, 9 Drawing Sheets

OTHER PUBLICATIONS

"The Domain Name System", http://www.incognito.com/pdf/WP_thedomainnamesystem.pdf, 2006.

Shaikh et al., "On the Effectiveness of DNS-based Server Selection", http://www.cs.cmu.edu/~mukesh/papers/dns-selection.pdf, 2001.

* cited by examiner

```
enum NamingProviderType
{
    ProviderType_Application,
    ProviderType_Service,
};

enum NamingProviderPrecedenceLevel
{
    ProviderPrecedenceLevel_Primary,
    ProviderPrecedenceLevel_Secondary,
};

typedef struct tag_NAMING_APIS_DOMAIN_DESCRIPTION
{
    ULONG                           ulNextEntryOffset;
    NamingProviderPrecedenceLevel   PrecLevel;
    DWORD                           cchDomainName;
    WCHAR                           dwDomainName[1];
} NAMING_APIS_DOMAIN_DESCRIPTION;

typedef struct tag_NAMING_APIS_PROVIDER_INSTALLATION_BLOB
{
    DWORD                           dwVersion;
    NamingProviderType              providerType;
    BOOL                            fSupportWildCards;
    DWORD                           dwNumDomainsDescriptions;
    NAMING_APIS_DOMAIN_DESCRIPTION  Domains[1];
} NAMING_APIS_PROVIDER_INSTALLATION_BLOB;
```

Fig.10.

RESOLVING NAMES TO NETWORK ENDPOINTS

BACKGROUND

With the advent and explosion of the Internet, huge numbers of computers have become networked together, with additional computers becoming connected each day. A connection to the Internet provides access to vast information resources in the form of the world wide web ("WWW"), communications resources in the form of electronic mail ("e-mail"), and a virtually limitless variety of other data and communications resources. In most cases, these resources are provided using a client-server infrastructure, whereby a central server computer provides the bulk of the required computing resources to a relatively large number of client computers.

Other types of network services rely on a peer-to-peer ("P2P") network infrastructure. In a P2P network, the computing power and bandwidth of participants in the network is utilized rather than concentrating it in a relatively low number of server computers. P2P networks are useful for many purposes, including instant messaging ("IM"), collaboration, content distribution, distributed processing, games, file sharing, and others. In a P2P network, the individual computers in the network, also referred to as nodes or peers, connect directly one another. In many cases, a P2P network may comprise an ad-hoc network created between just two nodes.

One difficulty that arises when setting up an ad-hoc P2P network stems from the fact that in order to establish a connection, it is typically necessary for one of the nodes to have network endpoint information for the other node. For instance, if two users want to play a network-capable multiplayer game, one user must know the network address of the other computer node in order to establish the connection. In another example, a remote assistance program may be utilized to allow a remote user to connect to a local node and to provide assistance with the computer to a user of the local node. In order to allow the remote user to connect, however, the network address of the local node must be determined and provided to the remote user. In situations like these, a user of one of the nodes typically determines the network address of their own computer and then transmits the network address to the other user. This process can be difficult and time consuming, especially for users that are not technically savvy or familiar with the process for determining the network address of a computer.

It is with respect to these considerations and others that aspects of a computing system for resolving a name to a network address are described below.

SUMMARY

A system, apparatus, method, and computer-readable medium are provided for resolving a name to a network endpoint. According to one aspect of the disclosure provided herein, a friendly name such as an e-mail address may be resolved into network endpoint information, such as a network address, for a corresponding computer system. The resolved network address can then be utilized to establish a connection to the computer system. This alleviates the need for a user to manually determine the network address and to transmit the network address to the other computer system.

According to one method described herein, one or more naming providers (also referred to herein as a "provider" or "providers") are registered with a computer system. The naming providers are operative to resolve names, such as e-mail addresses, to network addresses for one or more domains. In order to register a naming provider, the naming provider provides a list of domains for which the naming provider should be the primary naming provider. A naming provider can claim to be the primary naming provider for a domain if it owns all of the names within that domain and therefore has access to the master data for all such names.

A naming provider may also provide a list of domains for which the naming provider should be a secondary naming provider. A provider can claim that it is a secondary naming provider for a domain if it is in contact with the authority for the domain such that it is capable of returning the same result that a primary provider would return. There may be multiple secondary providers for a given domain, but should only be one primary provider. A provider can also register as a wildcard provider. Wildcard registration is used if the provider can handle a large variety of names, such that it could not define all those for which it can resolve names declaratively.

Once the providers have been registered, requests may be received to resolve an e-mail address into a network address of the corresponding computer system. The e-mail address includes a local part and a domain. In response to such a request, one or more of the registered providers are identified as being able to resolve names in the domain to network addresses. In particular, in order to identify the providers capable of resolving the e-mail address, the providers that are registered as primary for the domain, secondary for the domain, or registered as wildcard providers are identified. The identified providers are then sorted into a list, with the primary provider first, the secondary providers next, and any wildcard providers listed last.

Once the sorted list of providers has been created, requests are transmitted to the providers in the list requesting that they resolve the e-mail address to a corresponding network address. In particular, according to embodiments, the request to resolve the name may include an indication as to whether the provided results should be authoritative or that the provided results need not be authoritative. An authoritative result is returned where the provider does, in fact, own the domain identified in the e-mail or is federated with an authority for the domain. A non-authoritative result is returned where the provider has information for the domain, although it has no connection with the authority for the domain.

In the case where authoritative results are requested, resolution of the name is requested from each provider in the sorted list in order until one of the providers returns an authoritative response or each of the providers indicate that they cannot resolve the name or fail. In the case where non-authoritative results are accepted, resolution of the name is requested from each of the providers in the list and the results from each provider are collected and returned.

Once the results of the name resolution have been returned, the results are returned to the requestor. For instance, an application program may request resolution of the name, in which case the results are returned to the application. The application may then utilize the returned endpoint information to establish a network connection and to communicate with the computer system identified by the returned network address. In this manner, a name can be utilized to establish a network connection to a computer system, rather than a network address.

According to other aspects, a data format is disclosed for registering a naming provider. In particular, according to one implementation, the data format includes a first data field for storing data indicating that the provider is a primary naming provider for a domain. A second data field may be utilized to store data indicating that the provider is a secondary provider for a domain. A third data field may be utilized to specify that the provider is a wildcard naming provider.

The above-described subject matter may also be implemented as a computer-controlled apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4-8 are flow diagrams illustrating various processes provided herein for resolving a name to a network address;

FIG. 10 is a data structure diagram illustrating the format of a provider registration data format provided herein.

DETAILED DESCRIPTION

The following detailed description is directed to systems, methods, and computer-readable media for resolving names to network endpoints. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices. It should also be appreciated that although reference is made herein to the Internet, the embodiments presented herein may be utilized with any type of local area network ("LAN") or wide area network ("WAN").

Figure 1:
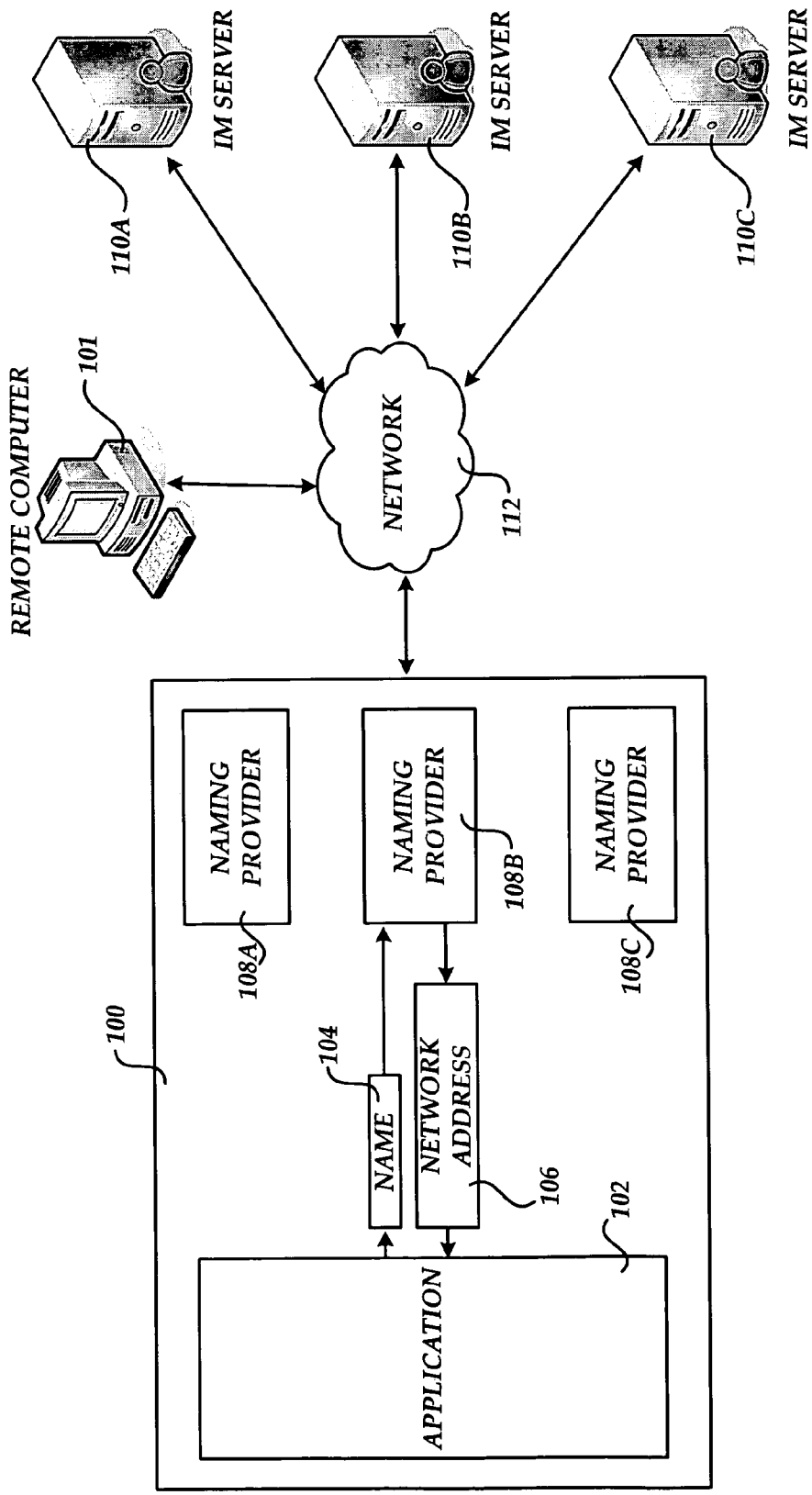
FIG. 1 is a network diagram showing an illustrative operating environment for the processes and computer systems described herein.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for resolving names to network endpoints will be described. In particular, FIG. 1 is a network diagram illustrating aspects of an illustrative operative environment for the subject matter described herein that includes a computer system 100. As shown in FIG. 1, the computer system 100 includes an application program 102. The application program 102 comprises a networked application program that utilizes a network address 106 to connect to a remote computer system 101.

As also shown in FIG. 1, the computer 100 also includes one or more naming providers 108A-108C. As will be described in greater detail below, the naming providers 108A-108C include functionality for resolving a name 104 to a network address 106 of a computer 101 associated with the name 104. In order to provide this functionality, the naming providers 108A-108C maintain data correlating names to corresponding network addresses. In an embodiment, the names may comprise e-mail addresses conforming to the RFC 2821, 2822, and 1642 specifications. Generally, e-mail addresses conforming to these specifications include a local part and a domain separated by an "@" symbol (e.g. localpart@domain).

In order to obtain the mapping between names and network addresses, the naming providers 108A-108C may communicate with server computers over the network 112. For instance, in one implementation, the functionality for resolving names to network addresses is provided by IM client applications. In this implementation, the IM client applications communicate with associated IM server computers 110A-110C over the network 112 to obtain the network addresses corresponding to names and to perform other functions. It should be appreciated that the naming providers 108A-108C may be provided by any type of application or service.

As will be discussed in greater detail below, prior to receiving a request from the application 102 to resolve a name 104 to a network address 106, each of the naming providers 108A-108C must register themselves with the computer 100. During registration, the naming providers 108A-108C identify the domains for which they are able to resolve names and specify the authoritativeness of the results they are able to provide. Additional details regarding the registration of the naming providers 108A-108C are provided below with respect to FIG. 4.

Once the naming providers 108A-108C have been registered, the application 102 may request that a name 104 be resolved to a network address 106. In order to provide the application 102 with a result, a number of processing steps are performed. In particular, the naming providers 108A-108C that may be able to resolve the name 104 with the requested authoritativeness are identified and sorted into a list. Providers in the list are then called with a request to resolve the name 104 to a corresponding network address 106. When an appropriate result is received from the providers 108A-108C, the result is returned to the application 102. The application 102 may then utilize the results to establish a connection with the computer system 101 identified by the returned network address. Additional details regarding the selection of the appropriate providers 108A-108C for a particular domain are provided below with respect to FIG. 6. Additional details regarding the manner in which the selected providers are queried are provided below with respect to FIG. 7. Additional details regarding the software architecture utilized to implement the embodiments of the invention described herein are provided below with respect to FIGS. 2-3.

Figure 2:
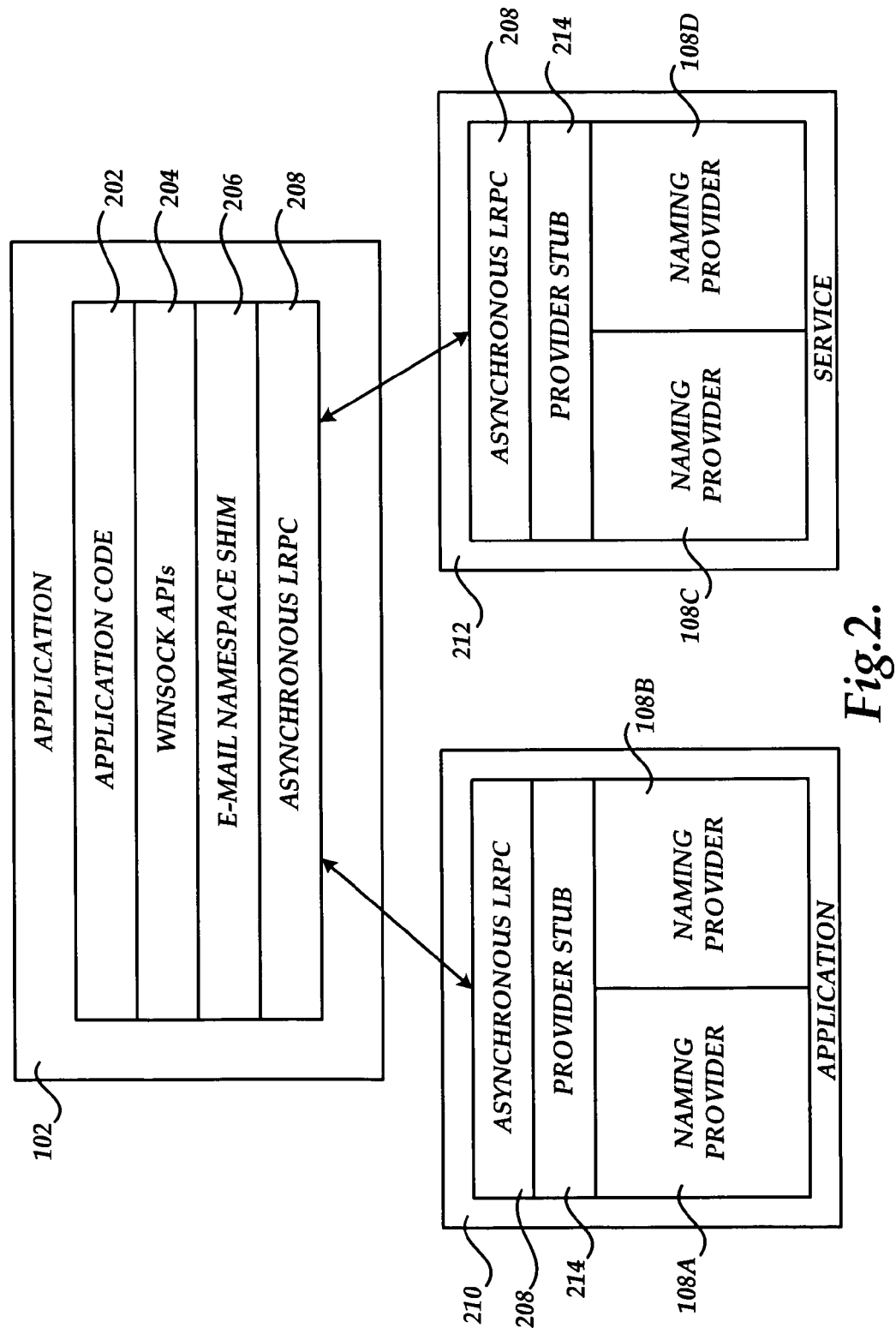
FIGS. 2 and 3 are software architecture diagrams illustrating aspects of a software architecture utilized by the embodiments presented herein.

Referring now to FIG. 2, additional details regarding a software architecture that may be utilized to implement the embodiments described herein will be presented. In particular, as shown in FIG. 2, an application 102 includes application code 102. The application code 102 utilizes the Winsock application programming interfaces ("APIs") 204 to establish and maintain network connections. As known to those skilled in the art, the Winsock APIs 204 comprise APIs that may be utilized by application programs for communicating with a TCP/IP networking stack.

According to aspects of the invention, the Winsock APIs 204 may be utilized by the application code 202 to request the resolution of a name to a network address. In particular, according to embodiments, the application 102 utilizes the GetAddrInfo, GetAddrInfoEx, and SetAddrInfoEx APIs. The Winsock APIs 204, in turn, call into the e-mail namespace shim 206. The e-mail namespace shim 206 implements the Winsock namespace provider ("NSP") version 1 interface the for the e-mail namespace and forwards these calls on to the providers 108A-108D. It should be appreciated that the functionality described herein as being performed by the e-mail namespace shim 206 may be performed by the Winsock APIs 204 or other type of network stack interface. Additional details regarding the function and structure of the e-mail namespace shim 206 are provided below with respect to FIG. 3.

Figure 3:
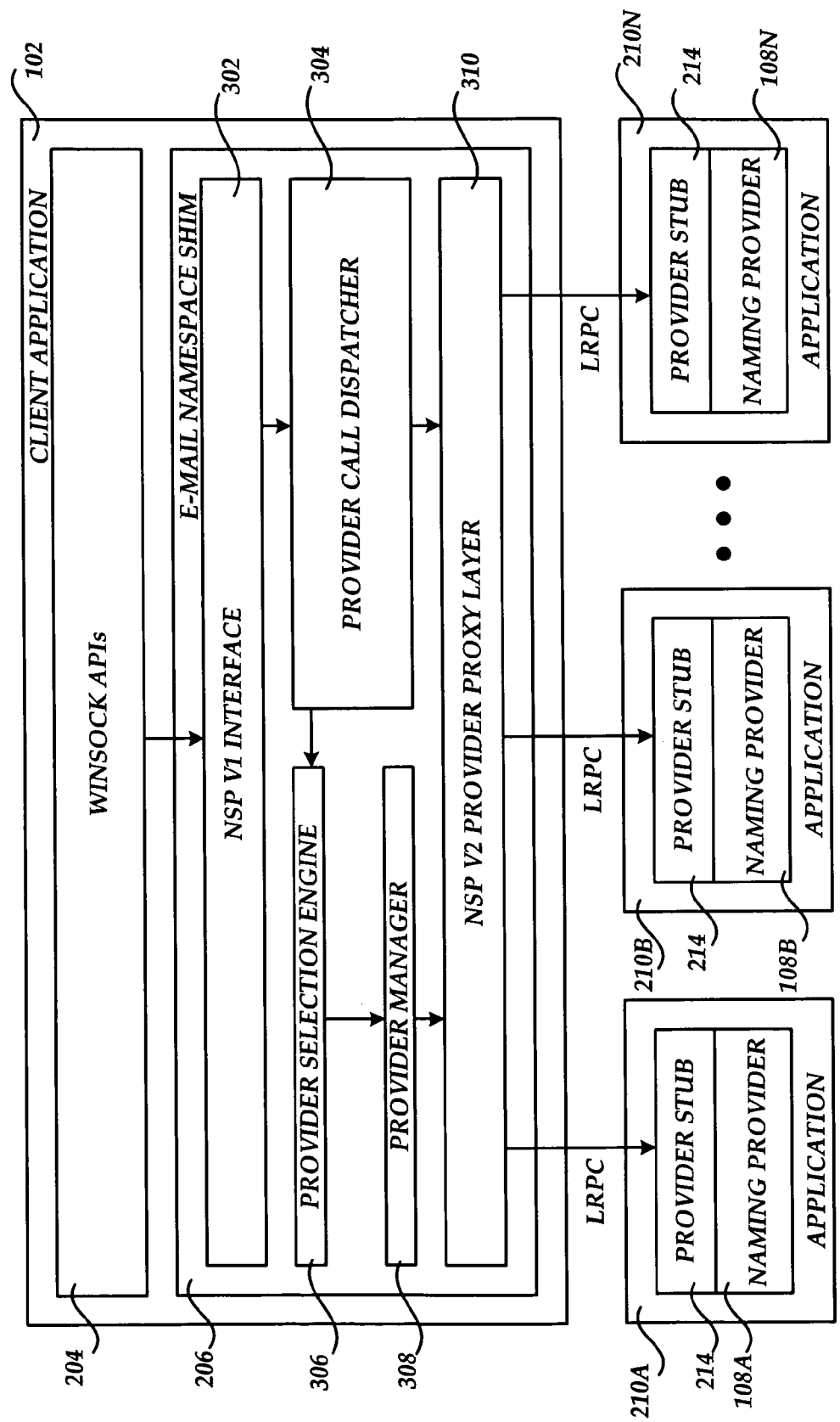

As shown in FIG. 3, an asynchronous lightweight remote procedure call ("LRPC") 208 is utilized to call the providers 108A-108D. By utilizing a LRPC, the providers 108A-108D can be hosted inside of services and applications. The LRPC also prevents third-party code from running in-process with the application 102. In the embodiment shown in FIG. 2, the providers 108A-108B are provided by an application 210 and the providers 108C-108D are provided by a service 212. As shown in FIG. 2, a provider stub 214 is also utilized to hide the RPC interface details and to translate cross procedure calls into in-process calls so that the providers 108A-108D do not have to be configured for RPC specific requirements. The provider stub 214 also implements support for publishing multiple providers from the same process and dispatching incoming calls to the correct provider.

As described briefly above, the e-mail namespace shim 206 is operative to discover the installed providers 108A-108D, to translate synchronous NSP version 1 calls into asynchronous version 2 calls, and back to synchronous, to select the appropriate providers 108A-108D for handing a resolution request based on the domain section of the e-mail address to be resolved, and to perform other functions. Additional details regarding the structure and operation of the e-mail namespace shim 206 are provided below with respect to FIG. 3.

Turning now to FIG. 3, further details regarding the software architecture presented in FIG. 2 will be provided. In particular, FIG. 3 illustrates additional details regarding the architecture of the e-mail namespace shim 206. As discussed briefly above, the Winsock APIs 204 call into the NSP V1 interface 302 provided by the e-mail namespace shim 206. The provider call dispatcher 304 accepts calls from the interface 302. In response to such a call, the provider call dispatcher 304 gathers a list of providers 108A-108N from the provider selection engine 306. The provider selection engine 306 gathers a list of the installed providers 108A-108N from the provider manager 308. The provider manager 308 is responsible for tracking the providers that are installed and running at any given time, and for tracking the provider proxies for those providers.

Once the provider call dispatcher 304 has received the list of providers, it then calls the list of providers 108A-108N via the provider proxy layer 310. When results are returned, the provider call dispatcher 304 returns the results to the interface 302 for return to the calling application 102. The provider proxy layer 310 is responsible for exposing a synchronous in-process interface for the providers 108A-108N. The proxy layer 310 wraps the asynchronous and cross-process nature of accessing the NSP version 2 providers 108A-108N. The dispatcher 304 calls into the proxy layer 310 to access a provider 108A-108N.

A provider stub 214 is also utilized by the providers 108A-108N. The provider stub 214 is a component loaded at the provider side that hides the RPC interface details and translates cross process calls into in-process calls so that the providers 108A-108N do not have to conform to RPC specific requirements. As discussed briefly above, the provider stub 214 also implements support for publishing multiple providers from the same process and dispatching incoming calls to the correct provider. Additional details regarding the operation of the e-mail namespace shim 302 will be provided below with respect to FIGS. 4-8.

Figure 4:
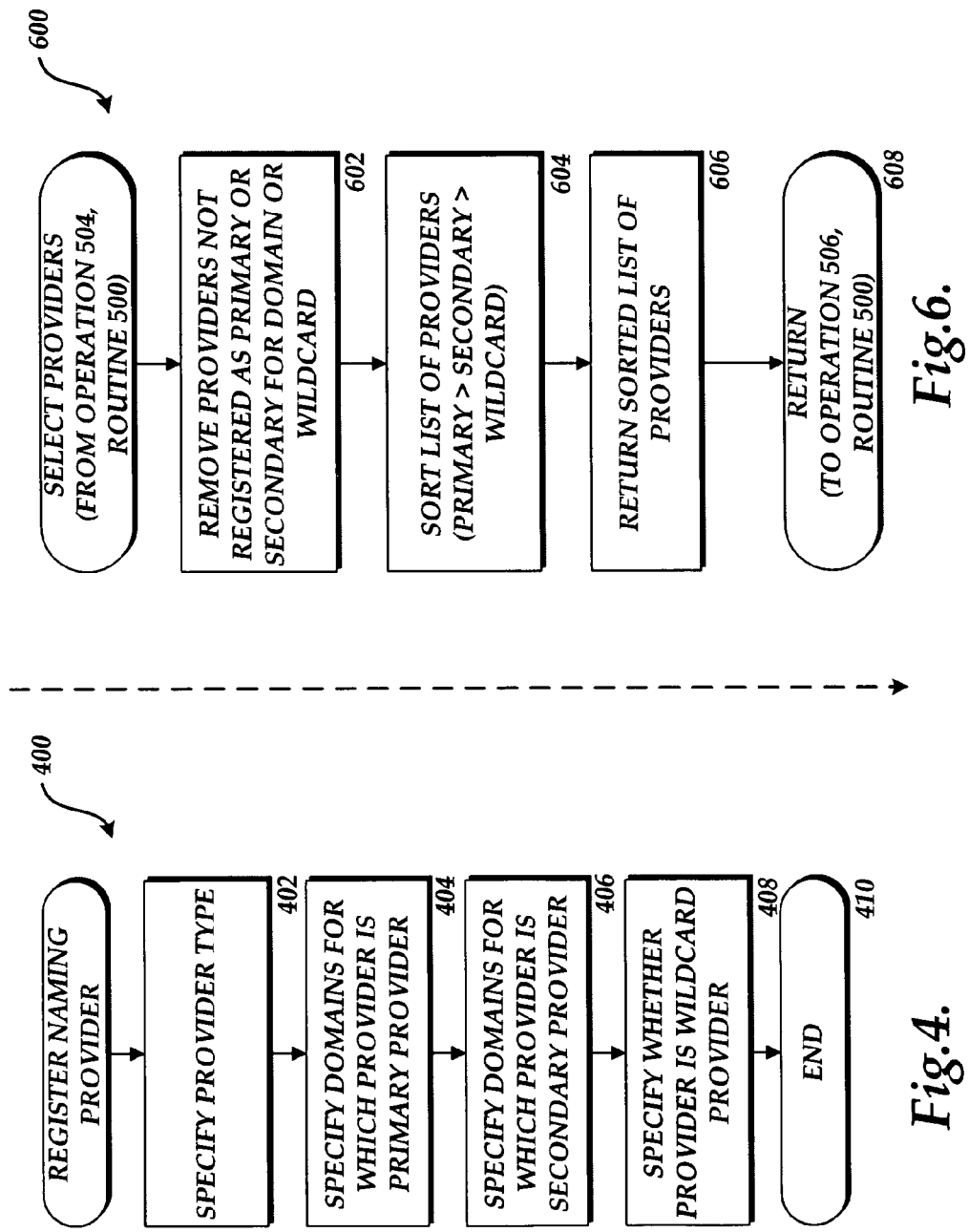

Referring now to FIG. 4, additional details will be provided regarding the embodiments presented herein for resolving a name to a network endpoint. In particular, FIG. 4 is a flow diagram illustrating a routine 400 for registering a naming provider. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

As discussed briefly above, each of the providers 108A-108N must register with the computer 100 before they can be utilized to resolve e-mail addresses to network addresses. This process typically takes place at the time the provider is installed, although the registration may be performed or updated at another time. Generally, each provider 108A-108N indicates during the registration process the domains for which they are capable of resolving names. This process is illustrated in the routine 400 of FIG. 4.

The routine 400 begins at operation 402, where the registering provider indicates its provider type. According to implementations, the provider may be an application or service. At operation 402, the provider indicates its type. From operation 402, the routine 400 continues to operation 404. At operation 404, the registering provider specifies the domains for which it is the primary provider, if any. A registering provider can claim to be the primary provider for a domain if it owns all of the names within that domain and therefore has access to the master data for all such names. In this manner, the registering provider can indicate that it should handle certain domains with priority over other providers. There should only be one provider that is registered as the primary provider for a domain. For instance, in one implementation, the MSN MESSENGER IM client application from MICROSOFT CORPORATION may register as the primary provider for the MSN.COM domain. Similarly, the YAHO MESSENGER IM client application from YAHOO may register as the primary provider for the YAHOO.COM domain. No other providers are permitted to register as the primary provider for these domains.

From operation 404, the routine 400 continues to operation 406, where the registering provider specifies the domains for which it is a secondary provider. A provider can claim that it is a secondary naming provider for a domain if it is in contact with the authority for the domain such that it is capable of returning the same result that a primary provider would return. This also implies that the secondary provider should be tried after the primary provider for the domain has been tried and has failed. There may be multiple secondary providers for a given domain. As an example, because a federation relationship currently exists between MSN and YAHOO, the MSN MESSENGER IM client application may register as a secondary provider for the YAHOO.COM domain. If the YAHO MESSENGER IM client application is unable to resolve a name, the MSN MESSENGER IM client application may be requested to resolve the name. Additional details regarding this process will be provided below.

From operation 406, the routine 400 continues to operation 408 where the registering provider may register as a wildcard provider. Wildcard registration is an assertion that the provider either has non-authoritative information for, or is federated with the authority for, a number of domains large enough that exhaustive explicit declaration would be impractical. Given this assertion, wildcard providers should be tried after all secondary providers have failed. Similarly, any name for which there is no primary or secondary provider will be passed to wildcard providers so that they may attempt to resolve the name. The MSN MESSENGER IM client application may register as a wildcard provider because arbitrary e-mail addresses may be utilized with the federated PASSPORT service.

As will be described in detail below, the result of the resolution request may be authoritative, for the case in which the provider did own the name in question or was federated with the authority for the name. Alternatively, the result may be non-authoritative where the provider has information for the name, but has no connection with the authority for the name. Additional details regarding the authoritativeness of the requested response and its impact on the processing operations performed by the e-mail namespace shim 206 will be provided below. It should be appreciated that the registering provider must register as a provider of at least one type for at least one domain or as a wildcard provider. Once the wildcard registration has been completed at operation 408, the routine 400 continues to operation 410, where it ends.

According to one implementation, a provider registration data format is provided. The registration data format comprises a data format expressed using the extensible markup language ("XML") that is utilized at registration time by a registering provider to specify its provider type as either an application or service. The data format is also utilized to specify the domains for which the registering provider is a primary or secondary provider. A Boolean data field is also utilized within the data format to indicate whether the registering provider is a wildcard provider. FIG. 10 illustrates the structure of the provider registration data format 1002 according to one implementation described herein.

Figure 5:
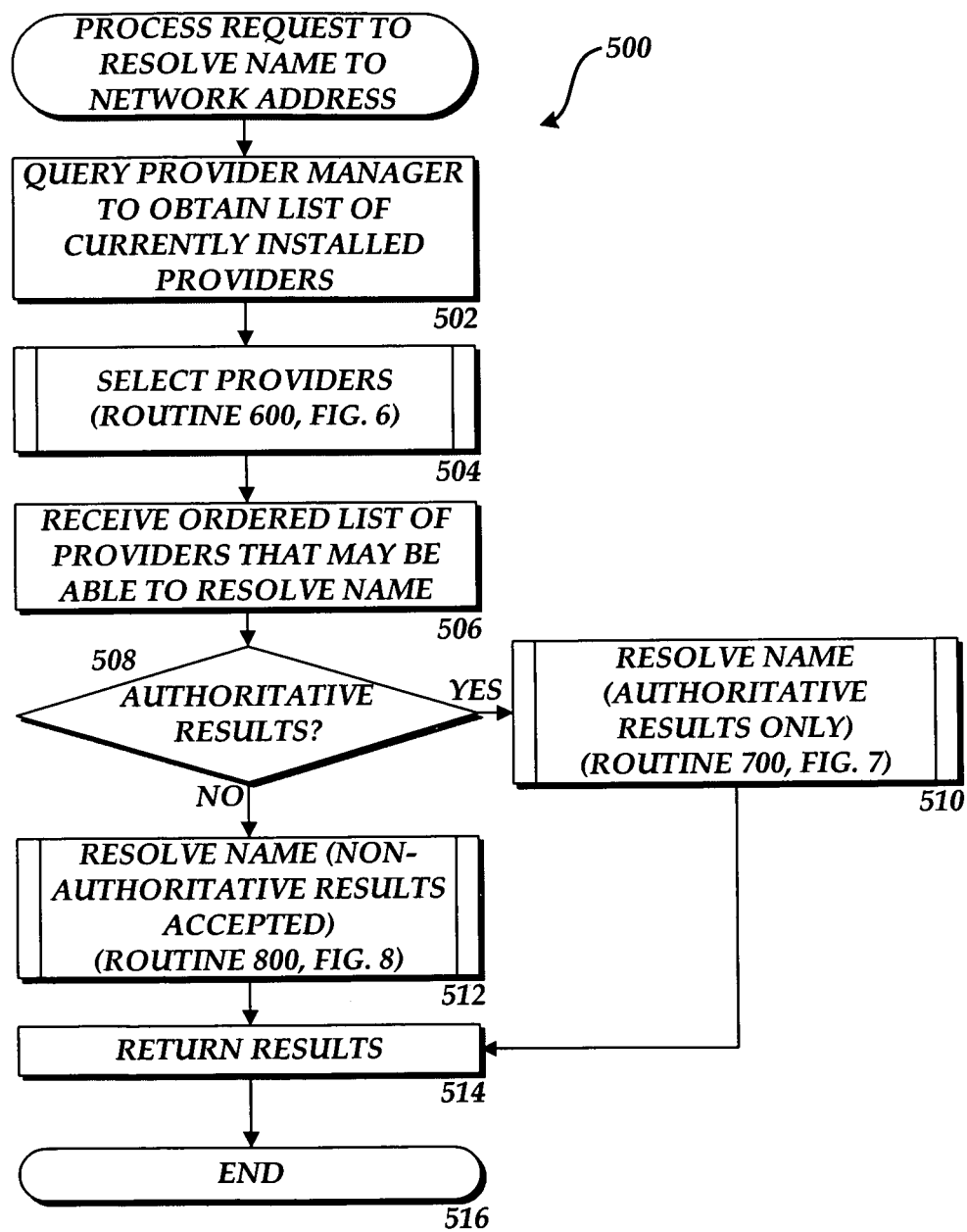

Turning now to FIG. 5, additional details will be provided regarding the embodiments provided herein for resolving an e-mail address to a network address. As discussed briefly above, once the registration of one or more providers 108A-108N has completed, requests can be accepted for resolving e-mail addresses to network addresses. The routine 500 shown in FIG. 5 illustrates the processing of such requests. In particular, the routine 500 begins at operation 502 where, in response to a resolution request that includes an e-mail address, the provider call dispatcher 304 queries the provider selection engine 306 for an ordered list of the providers that should be utilized to resolve the specified name. In order to generate the list, the provider selection engine 306 queries the provider manager 308 for a list of the currently installed providers. This occurs at operation 502.

From operation 502, the routine 500 continues to operation 504, where a provider preference algorithm is performed by the provider selection engine 306. The provider preference algorithm takes the name to be resolved as input and orders the providers according to how likely they are to be able to resolve the name based upon the registration information provided by the providers at registration time. An illustrative routine 600 for selecting and sorting the providers into an ordered list will be described below with reference to FIG. 6. From operation 504, the routine 500 continues to operation 506.

At operation 506, the provider call dispatcher 304 receives the ordered sub-list of providers that may be able to resolve the specified name. From operation 506, the routine 500 continues to operation 508, where a determination is made as to whether the request for name resolution indicated that the results should be authoritative or whether the results of the resolution may be non-authoritative. As discussed above, authoritative results indicate that the provider owns the name in question or was federated with an authority for the name. Non-authoritative results indicate that the provider has information for the name, but has no connection with the authority for the name.

If the results must be authoritative, the routine 500 branches to operation 510 where the providers in the ordered list are queried using an LRPC in a manner designed to ensure that only authoritative results are received. An illustrative routine 700 for querying the providers to obtain authoritative results is discussed below with reference to FIG. 7. If the results may be non-authoritative, the routine 500 continues from operation 508 to operation 512, where the providers in the ordered list are queried in a manner designed to retrieve results that may or may not be authoritative. An illustrative routine 800 for retrieving non-authoritative results is discussed below with respect to FIG. 8. From operations 510 and 512, the routine 500 continues to operation 514, where the results received from the providers are returned to the calling application. The calling application may then utilize the results to establish a connection to or otherwise communicate with the computer at the network address specified in the results. From operation 514, the routine 500 continues to operation 516, where it ends.

Referring now to FIG. 6, an illustrative routine 600 will be described for generating a sorted sub-list of providers that are likely to be able to resolve the e-mail address specified in the resolution request. In particular, the routine 600 begins at operation 602 where any providers not registered as a primary provider for the specified domain, as a secondary provider for the specified domain, or as a wildcard provider are removed from the list. This ensures that no providers will be queried that cannot possibly resolve the specified domain. From operation 602, the routine 600 continues to operation 604.

At operation 604, the remaining providers are sorted. In particular, the providers are sorted in order of their potential ability to return authoritative results in response to the resolution request. Sorting this list in this manner results in the primary provider for the specified domain, if any, to be located at the beginning of the list. The primary provider is followed in the list by any secondary providers for the specified domain and, finally, any wildcard providers are listed last. As will be described in detail below with reference to FIG. 7, the order of the providers in the ordered list determines the order in which the providers are called to resolve the specified name. From operation 604, the routine 600 continues to operation 606, where the sorted list of providers is returned to the provider call dispatcher 304.

Figure 7:
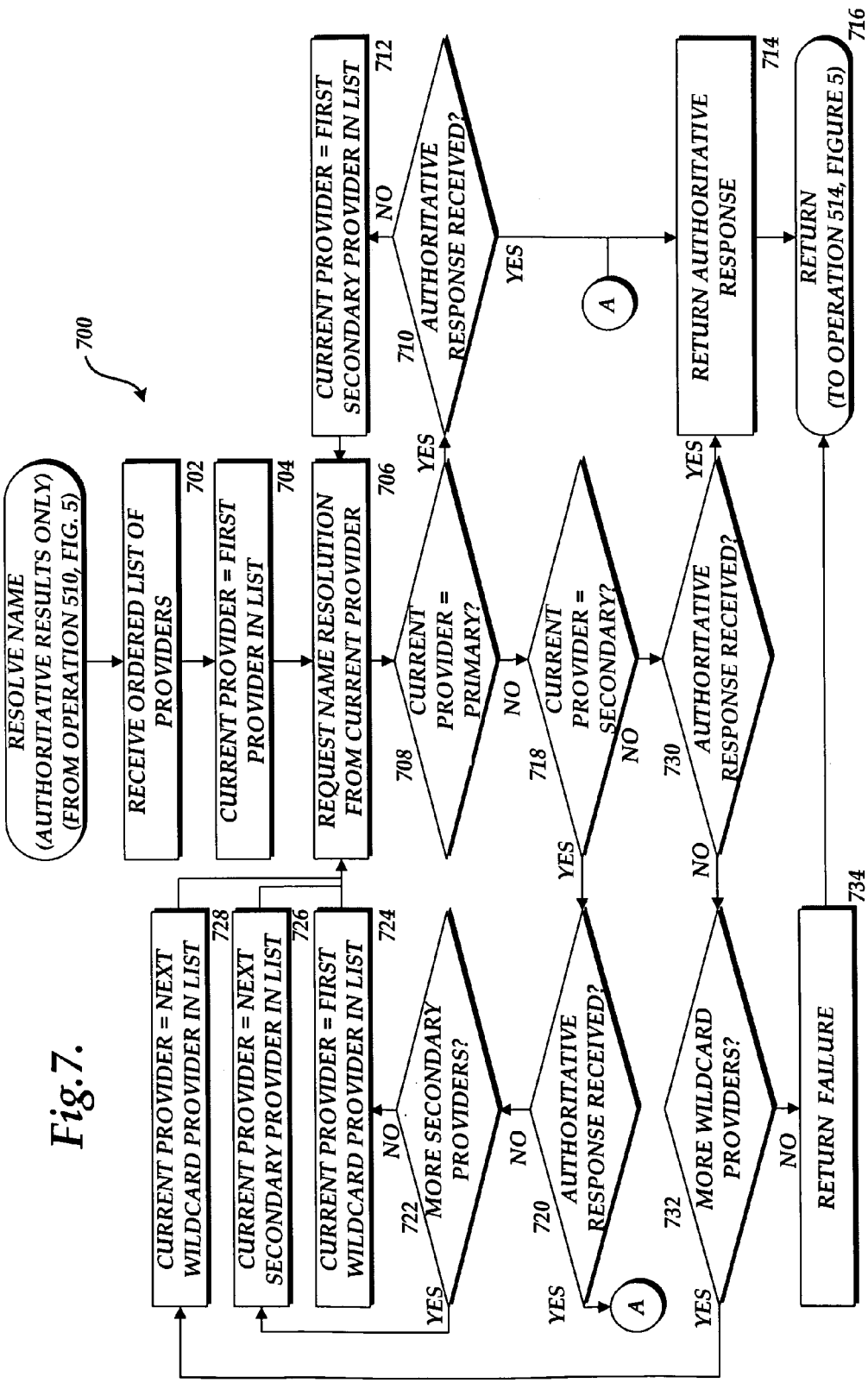

Turning now to FIG. 7, an illustrative routine 700 will be described for resolving the specified name where authoritative results are required. In particular, the routine 700 begins at operation 702, where the ordered list of providers is received by the provider call dispatcher 304. The routine 700 then continues to operation 704, where the value of a temporary variable utilized to store data identifying the current provider in the list is set as the first provider in the list. From operation 704, the routine 700 continues to operation 706, where a LRPC resolution request is transmitted to the current provider for the specified name. Once the request has been made, the routine 700 continues to operation 708, where a determination is made as to whether the current provider is the primary provider for the specified domain. If so, the routine 700 branches to operation 710, where a determination is made as to whether an authoritative response to the request has been received.

An authoritative response may be positive indicating that an error did not occur and that the provider was able to resolve the name, or negative indicating that an error did not occur and the provider could not resolve the name. A positive authoritative response indicates that other providers should not be permitted to give back a negative response or a different positive response. Negative authoritative responses indicate that other providers should not be able to return a positive authoritative response, and therefore other providers are not tried when authoritative results are required. The provider may alternatively return an error response. When an error response is received, other providers are tried because secondary providers may be able to service the request even though the primary or another secondary provider could not.

Accordingly, if at operation 710 it is determined that an authoritative response was received, the routine 700 branches from operation 710 to operation 714, where the authoritative response is returned. If at operation 710 it is determined that an authoritative response was not received, the routine 700 branches from operation 710 to operation 712, where the current provider in the ordered list is set to the first secondary provider in the list. From operation 712, the routine 700 continues to operation 706, where the current provider is requested to resolve the specified name.

If at operation 708, it is determined that the current provider is not the primary provider for the specified domain, then the routine 700 continues from operation 708 to operation 718. At operation 718, a determination is made as to whether the current provider is a secondary provider. If so, the routine 700 branches from operation 718 to operation 720. At operation 720, a determination is made as to whether an authoritative response has been received from the current provider. If so, the routine 700 branches from operation 720 to operation 714, where the authoritative response is returned. Otherwise, the routine 700 continues from operation 720 to operation 722, where a determination is made as to whether more secondary providers remain to be tried. If not, the routine 700 continues from operation 722 to operation 724, where the current provider is set to the first wildcard provider in the list. If so, the routine 700 branches to operation 726, where the current provider is set to the next secondary provider in the list. From operations 724 and 726, the routine 700 continues to operation 706 where a resolution request is transmitted to the current provider.

If at operation 718, it is determined that the current provider is not a secondary provider, then the routine 700 continues from operation 718 to operation 730. At operation 730 a determination is made as to whether an authoritative response has been received from the current wildcard provider. If so, the routine 700 branches from operation 730 to operation 714, where the authoritative response is returned. If not, the routine 700 branches from operation 730 to operation 732, where a determination is made as to whether additional wildcard providers remain to be tried in the ordered list. If so, the routine 700 branches from operation 728, where the current provider is set to the next wildcard provider in the list. Otherwise, the routine 700 branches from operation 732 to operation 734, where failure is returned. From operations 734 and 714, the routine 700 continues to operation 716, where it returns to operation 514, described above with reference to FIG. 5.

Figure 8:
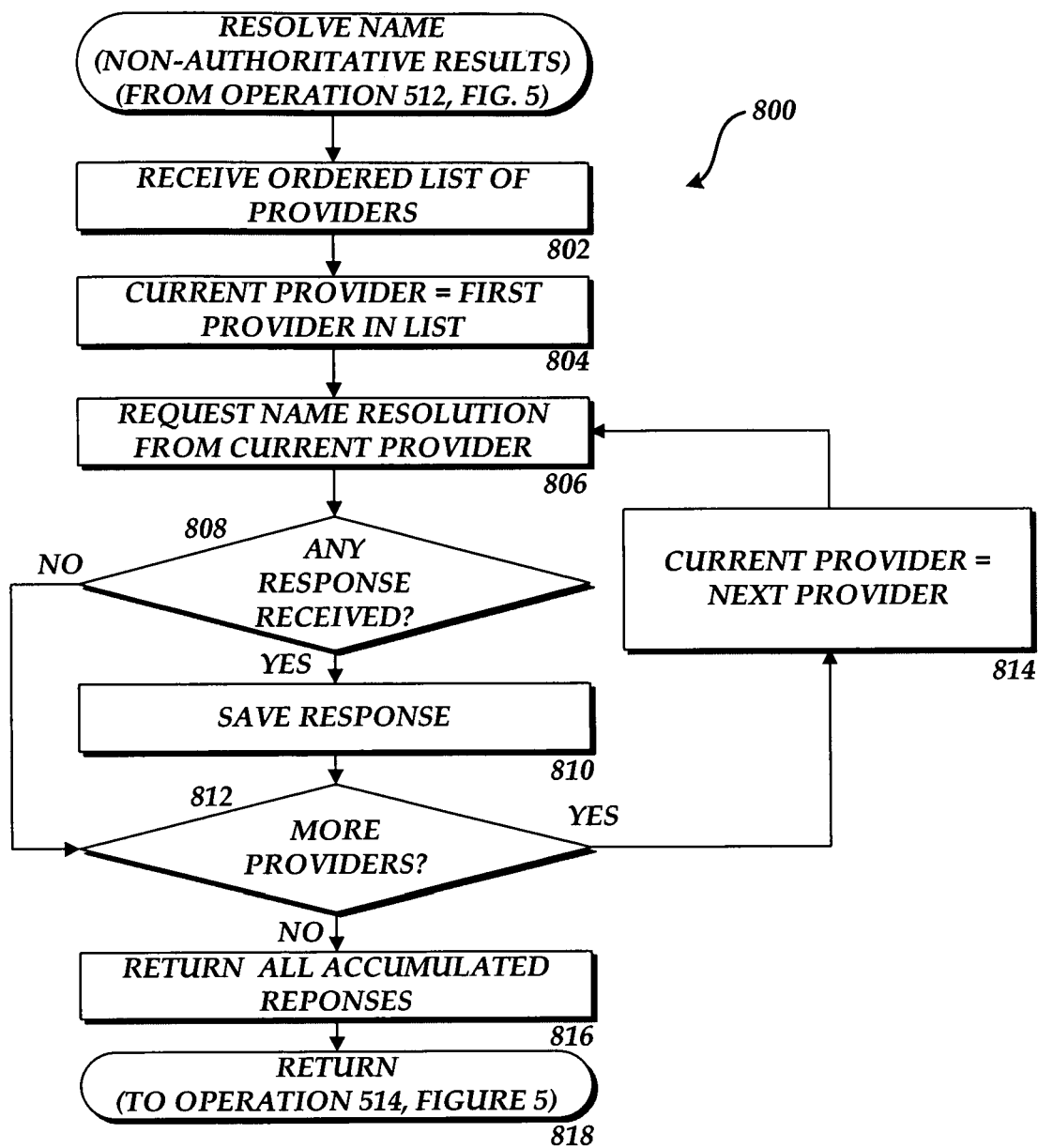

Referring now to FIG. 8, an illustrative routine 800 will be described for resolving the specified name where authoritative results are not required. In particular, the routine 800 begins at operation 802, where the ordered list of providers is received by the provider call dispatcher 304. The routine 800 then continues to operation 804, where the value of a temporary variable utilized to store data identifying the current provider in the list is set as the first provider in the list. From operation 804, the routine 800 continues to operation 806, where a LRPC resolution request is transmitted to the current provider for the specified name.

Once the resolution request has been made at operation 806, the routine 800 continues to operation 708, where a determination is made as to whether any response has been received from the current provider. If so, the routine 800 continues to operation 810, where the response is saved. Otherwise, the routine 800 branches from operation 808 to operation 812, where a determination is made as to whether the list includes more providers that should be tried. If so, the routine 800 branches from operation 812 to operation 814, where the current provider is set to the next provider in the list. From operation 814, the routine 800 continues to operation 806, where the current provider in the list is requested to resolve the specified name.

If at operation 812, it is determined that the list does not contain more providers to try, the routine 800 continues to operation 816. At operation 816, all of the saved responses from the providers are returned in response to the resolution request. From operation 816, the routine 800 continues to operation 818, where it returns to operation 514, described in detail above with respect to FIG. 5. It should be appreciated that, although not illustrated in FIG. 8, the resolution requests may be transmitted in parallel to each of the providers in the list.

According to other embodiments, a client application 102 may call the resolution APIs provided herein with a request to retrieve the names that can be published on the system easily. In particular, according to one implementation, a client application 102 can request from the naming providers 108A-108N all of the names for which they can publish without any additional configuration or information. This occurs, for instance, when a naming provider includes both the name and a corresponding password. Therefore, each provider that has the name stored along with the corresponding credentials returns a name to the calling client. This is useful because it allows a client application 102 to identify the publishable names and prompt the user for which name to use rather than requiring the user to type in a name that they may not remember, misspell, or otherwise provide incorrectly.

Figure 9:
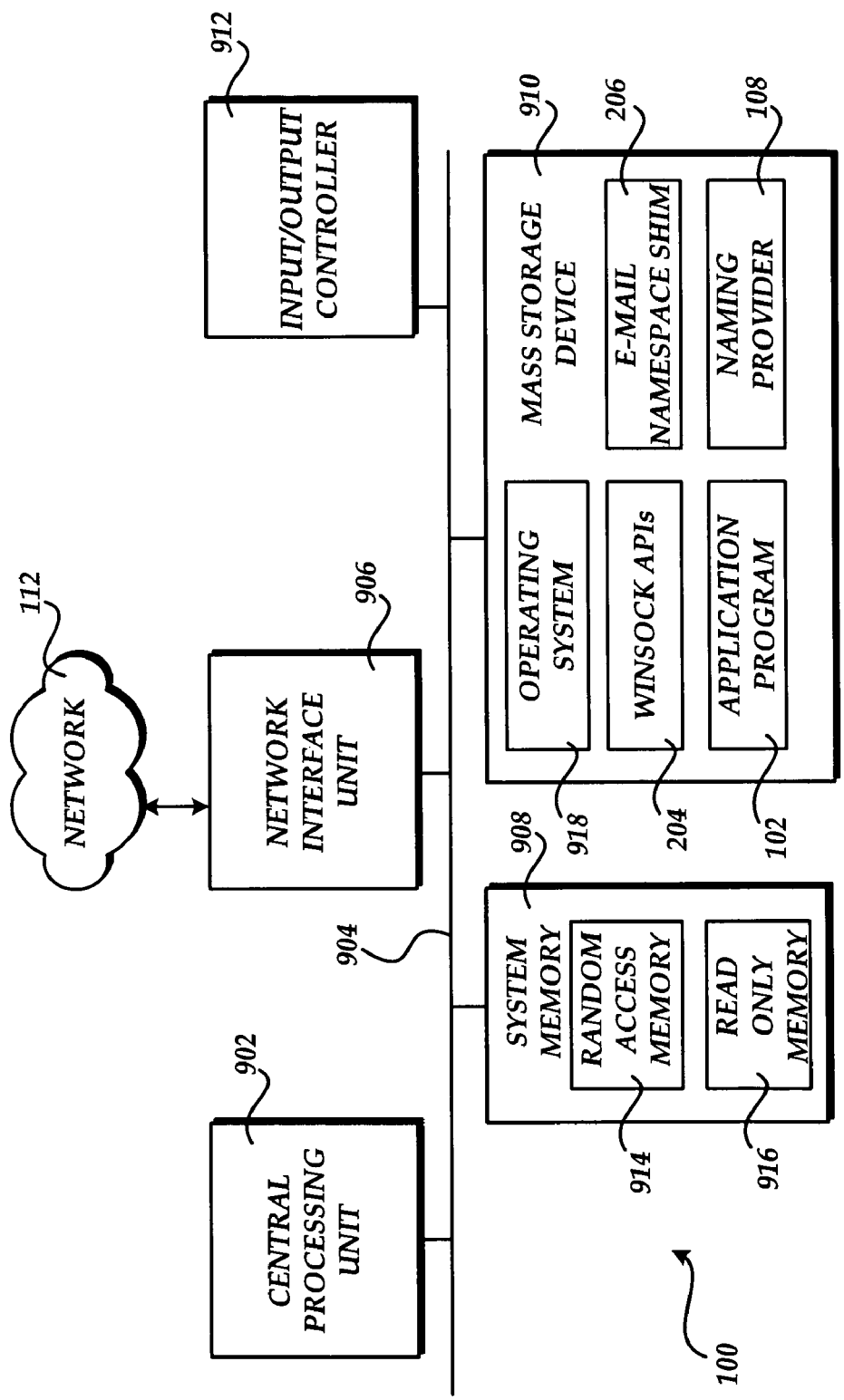
FIG. 9 is a computer architecture diagram showing a computer architecture suitable for implementing the various computer systems described herein.

Referring now to FIG. 9, an illustrative computer architecture for a computer 100 utilized in the various embodiments presented herein will be discussed. The computer architecture shown in FIG. 9 illustrates a conventional desktop, laptop computer, or server computer. The computer architecture shown in FIG. 9 includes a central processing unit 902 ("CPU"), a system memory 908, including a random access memory 914 ("RAM") and a read-only memory ("ROM") 916, and a system bus 904 that couples the memory to the CPU 902. A basic input/output system containing the basic routines that help to transfer information between elements within the computer 100, such as during startup, is stored in the ROM 916. The computer 100 further includes a mass storage device 910 for storing an operating system 918, application programs, and other program modules, which will be described in greater detail below.

The mass storage device 910 is connected to the CPU 902 through a mass storage controller (not shown) connected to the bus 904. The mass storage device 910 and its associated computer-readable media provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 100.

According to various embodiments, the computer 100 may operate in a networked environment using logical connections to remote computers through a network 112, such as the Internet. The computer 100 may connect to the network 112 through a network interface unit 906 connected to the bus 904. It should be appreciated that the network interface unit 906 may also be utilized to connect to other types of networks and remote computer systems. The computer 100 may also include an input/output controller 912 for receiving and processing input from a number of other devices, including a keyboard, mouse, or electronic stylus (not shown in FIG. 9). Similarly, an input/output controller may provide output to a display screen, a printer, or other type of output device (also not shown in FIG. 9).

As mentioned briefly above, a number of program modules and data files may be stored in the mass storage device 910 and RAM 914 of the computer 100, including an operating system 918 suitable for controlling the operation of a networked computer, such as the WINDOWS XP operating system from MICROSOFT CORPORATION of Redmond, Wash., or the WINDOWS VISTA operating system, also from MICROSOFOT CORPORATION. The mass storage device 910 and RAM 914 may also store one or more program modules. In particular, the mass storage device 910 and the RAM 914 may store an application program 102, Winsock APIs 204, an e-mail namespace shim 206, and one or more naming providers 108. Each of these software components has been described in great detail above.

Based on the foregoing, it should be appreciated that systems, methods, and computer-readable media for resolving names to network endpoints are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims. The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for resolving a name to a network address, the method comprising performing computer-implemented operations on a computer system for:

registering one or more providers with the computer system by receiving from each of the one or more providers a list of domains for which the each of the one or more providers is a primary provider and a list of domains for which the each of the one or more providers is a secondary provider or an indication that the each of the one or more providers is a wildcard provider, each of the one or more providers comprising an application or a service executing on the computer system and being operative to resolve names to network addresses;

receiving a request to resolve a name to a network address from an application executing on the same computer system as the one or more providers, wherein the name comprises an electronic mail address having a local part and a domain;

in response to the request, identifying one or more of the providers as being able to resolve the name to the network address;

requesting that one or more of the identified providers resolve the name to a network address;

receiving a network address in response to the request from the one or more of the providers; and providing the received network address to the application for use in communicating communicate with a computer system identified by the network address.

2. The method of claim 1 wherein identifying one or more of the providers as being able to resolve the name to the network address comprises:

identifying the providers registered as a primary provider for the domain of the electronic mail address, as a secondary provider for the domain of the electronic mail address, or as a wildcard provider as being able to resolve the name to the network address, and sorting the identified providers into a sorted list.

3. The method of claim 2, wherein the request to resolve the name to a network address comprises an indication that the provided results should be authoritative, and wherein requesting that one or more of the identified providers resolve the name to a network address comprises:

requesting resolution of the name from each of the providers in the sorted list in order until one of the providers returns an authoritative response or each of the providers indicate that they cannot resolve the name.

4. The method of claim 2, wherein the request to resolve the name to a network address comprises an indication that the provided results need not be authoritative, and wherein requesting that one or more of the identified providers resolve the name to a network address comprises:
requesting resolution of the name from each of the providers in the sorted list in order and collecting a response from each responding provider.

5. The method of claim 4, wherein the providers are instant messaging client application programs.

6. The method of claim 5, wherein the instant messaging client application programs communicate with instant messaging server computers to resolve the name to a network address.

7. A computer-implemented method for resolving an electronic mail (e-mail) address to a network address, the method comprising performing computer-implemented operations on a computer system for:
registering one or more providers by receiving from each of the one or more providers an indication comprising data identifying the domains for which the each of the one or more providers is a primary provider and data indicating the domains for which the each of the one or more providers is a secondary provider or data indicating whether the each of the one or more providers is a wildcard provider, the each of the one or more providers operative to resolve e-mail addresses in the domains identified by the indication to network addresses;
receiving a request from an application executing on the same computing system as the one or more providers to resolve an e-mail address to a network address, the e-mail address having a local part and a domain;
identifying one or more of the registered providers for handing the request based on the domain of the e-mail address and upon the indication provided from each of the one or more providers regarding the domains for which the each of the one or more providers can resolve names; and
requesting resolution of the e-mail address to a network address from the identified providers.

8. The method of claim 7, wherein the request to resolve an e-mail address to a network address further comprises an indication that the response to the request must be authoritative, and wherein requesting resolution of the e-mail address to a network address from the identified providers comprises:
requesting resolution of the e-mail address from each of the identified providers in order until one of the providers returns an authoritative response or each of the providers indicate that they cannot resolve the e-mail address.

9. The method of claim 7, wherein the request to resolve an e-mail address to a network address further comprises an indication that the response to the request need not be authoritative, and wherein requesting resolution of the e-mail address to a network address from the identified providers comprises:
requesting resolution of the name from each of the identified providers and collecting the responses from the providers.

10. The method of claim 7, wherein the providers are instant messaging client application programs.

11. The method of claim 10, wherein the instant messaging client application programs communicate with instant messaging server computers to resolve the name to a network address.

12. A computer-readable storage medium having computer-executable instructions stored thereupon which, when executed by a computer, cause the computer to:
register one or more instant messaging client applications as naming providers with the computer system by receiving from each of the one or more instant messaging client applications a list of domains for which the each of the one or more instant messaging client applications is a primary naming provider and a list of domains for which the each of the one or more instant messaging client applications is a secondary naming provider or an indication that the each of the one or more instant messaging client applications is a wildcard naming provider, the each of the one or more instant messaging client applications configured to communicate with an instant messaging server computer to resolve e-mail addresses to network addresses;
receiving a request to resolve an e-mail address to a network address from an application executing on the same computer system as the naming providers;
in response to the request, identifying one or more of the instant messaging client applications as being able to resolve the e-mail address to the network address;
requesting that one or more of the identified instant messaging client applications resolve the e-mail address to a network address;
receiving a network address in response to the request from the one or more of the instant messaging client applications; and
providing the received network address to the application for use in communicating with a computer system identified by the network address.

* * * * *

UNITED STATES PATENT AND TRADEMARK OFFICE
CERTIFICATE OF CORRECTION

| | |
|---|---|
| PATENT NO. | : 7,711,853 B2 |
| APPLICATION NO. | : 11/486782 |
| DATED | : May 4, 2010 |
| INVENTOR(S) | : Noah Horton et al. |

It is certified that error appears in the above-identified patent and that said Letters Patent is hereby corrected as shown below:

In column 12, line 52, in Claim 1, after "communicating" delete "communicate".

Signed and Sealed this
Eighth Day of February, 2011

David J. Kappos
*Director of the United States Patent and Trademark Office*